United States Patent
Wang et al.

(10) Patent No.: US 6,538,802 B2
(45) Date of Patent: Mar. 25, 2003

(54) SYSTEM AND METHOD FOR TILT MIRROR CALIBRATION DUE TO CAPACITIVE SENSOR DRIFT

(75) Inventors: Xiaomei Wang, Winchester, MA (US); Dale C. Flanders, Lexington, MA (US)

(73) Assignee: Axsun Technologies, Inc, Billerica, MA (US)

( * ) Notice: Subject to any disclaimer, the term of this patent is extended or adjusted under 35 U.S.C. 154(b) by 78 days.

(21) Appl. No.: 09/919,119

(22) Filed: Jul. 31, 2001

(65) Prior Publication Data
US 2003/0025982 A1 Feb. 6, 2003

(51) Int. Cl.[7] .................................................. G02F 1/29
(52) U.S. Cl. ....................................................... 359/298
(58) Field of Search ................................ 359/290, 291, 359/292, 298, 295, 224, 230, 849; 427/162, 534; 385/18

(56) References Cited

U.S. PATENT DOCUMENTS

| 6,172,797 B1 | * | 1/2001 | Huibers ...................... 359/291 |
| 6,178,284 B1 | | 1/2001 | Berggmann et al. ........ 385/140 |
| 6,275,326 B1 | * | 8/2001 | Bhalla et al. ................ 359/298 |
| 6,293,680 B1 | * | 9/2001 | Bruns .......................... 359/849 |
| 2002/0075553 A1 | * | 6/2002 | Orcutt ......................... 385/18 |
| 2002/0163709 A1 | * | 11/2002 | Mizra ......................... 359/295 |

FOREIGN PATENT DOCUMENTS

WO        01/46741        6/2001       .......... G02B/26/08

* cited by examiner

Primary Examiner—Georgia Epps
Assistant Examiner—Gary O'Neill
(74) Attorney, Agent, or Firm—J. Grant Houston (57) ABSTRACT

A movable MEMS mirror system with a mirror position detection system, such as a capacitive sensor, is calibrated using a physical stop with a range of movement of the mirror structure. Thus, drift in the position detection system can be compensated without the need for a separate reference signal source as used in conventional systems.

16 Claims, 8 Drawing Sheets

SYSTEM AND METHOD FOR TILT MIRROR CALIBRATION DUE TO CAPACITIVE SENSOR DRIFT

BACKGROUND OF THE INVENTION

Tilt mirror microelectromechanical system (MEMS) devices are used in a number of optical applications involving steering optical beams. Most commonly, they are used as beam switches. They route optical signals between various optical fibers. In this application, they can be used in low port count switches such as two-by-two (2×2) switches to systems having very large fabrics with hundreds to thousands of ports.

In the most typical configuration, each tilt mirror comprises a mirror body on which a reflective coating has been deposited. Torsion arms extend from this mirror body to a support. Electrostatic forces are used to tilt the mirror body relative to the support on the torsion arms by establishing electrostatic fields between the mirror body and fixed electrodes.

A more complex example of a tilt mirror system is a tip/tilt mirror. Torsion arms extend between the mirror body and a support along one axis and then, another set of torsion arms extend between the support and a final outer support along an orthogonal axis. In this way, the mirror can be rotated around two orthogonal axis or in two dimensions.

The cores of single mode optical fiber, which is common throughout the communications industry, are small, between five and ten micrometers in diameter. As a result, when coupling optical signals between optical fibers, the tilt mirrors must be positioned to precise angular positions.

In the first implementations of the MEMS tilt mirror arrays, the angular position of the tilt mirrors was controlled simply by varying the electrostatic voltages. During the manufacture, a map of electrostatic drive voltage to angular position can be generated. During operation, a desired angular position is then achieved by reference to the corresponding electrostatic drive voltage in a look-up table.

These systems, without positional feedback, had a number of problems, however. They were sensitive to drift, orientation, and vibration, thus requiring periodic recalibration of the look-up tables.

More recently, position detection systems have been integrated with the MEMS tilt mirror systems. Specifically, capacitive sensors have been deployed. In these systems, the instantaneous position of the tilt mirror can be determined by reference to the capacitance between the tilt mirror and a fixed electrode. This enables finer control of the tilt mirror position, makes the arrays less susceptible to vibration, and makes them robust against acceleration due to gravity, for example.

One problem associated with these capacitive sensors, however, is long-term drift. The capacitance changes that the sensor must detect are small. Consequently, changes in the temperature of the electronics and aging result in apparent changes in mirror position. As a result, even with capacitive sensing, these tilt mirror arrays must still be calibrated. The typical approach is to guide a calibration beam to a fixed detector. This provides a known reference against which the position detection systems can be calibrated.

SUMMARY OF THE INVENTION

For each mirror, a fixed source/detector pair can be employed, which can contribute to the cost of the final module. Many times in these systems, a stopped mirrors are proposed when the mirrors must simply move between two different states. Physical stops are provided within the mirror's range of movement and the mirror is simply driven into engagement with the stops.

The drawback with stopped mirror systems, however, concerns the fact that the manufacturing tolerances must be controlled so that different mirrors have the same angular orientation when engaging these stops. Mirror to mirror precisions of less then 0.1 degrees is typically required.

The present invention is directed to a movable MEMS mirror system with a mirror position detection system such as a capacitive sensor. The position detection system, however, can be calibrated without a calibration signal generator and detector. Specifically, stops are provided and position detection system for the mirror structure is then self-calibrated in the field relative to these stops.

In general, according to one aspect, the invention features a movable MEMS mirror system. It comprises a movable mirror structure having a range of movement. A mirror actuation system is used to move the mirror structure. Further, a stop is provided. A mirror structure position detection system then electrically monitors a position of the moveable mirror structure within the range of movement. A calibration system calibrates the mirror structure position detection system in response to a detected position of the moveable mirror based on contact with the stop. As a result, drift in the mirror structure position detection system can be compensated.

Typically, the movable mirror structure comprises a reflective metal coating such as aluminum or gold. In other cases, a dielectric thin film mirror coating is used.

The mirror structure typically comprises a mirror body and at least two hinges or torsion arms that connect the mirror body to a support. In still other embodiments, this support is then connected to a further outer support by two additional torsion arms, for example, to enable tip-tilt movement of the mirror structure.

In some embodiments, the stop is positioned over the mirror structure, whereas in other implementations, the stop is located under the mirror structure. In one implementation, the stop is positioned within a range of movement of the mirror structure. Thus, the moveable mirror structure can be moved into direct contact with the stop.

In more detail, the calibration system controls the mirror actuation system to pivot the mirror structure into contact with the stop and then calibrates the mirror structure position detection system in response to this known reference point.

In another embodiment, a moveable calibration structure is provided, along with a calibration structure position detection system, which monitors the position of the calibration structure. In this example, the calibration structure contacts the mirror structure and the stop. The calibration system then determines a position of the mirror structure in response to the distance the calibration structure moves between contact with the stop and contact with the mirror structure. The system has advantages in that the mirror structure does not need to be moved to perform the calibration process.

In general, according to another aspect, the invention features a method for calibrating a position detection system of a MEMS mirror system. This method comprises actuating a movable mirror structure in response to positional information from a mirror structure position detection system. To compensate for drift in this detection system, periodically, calibration of the mirror structure position detection system is performed based on the position of a stop.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
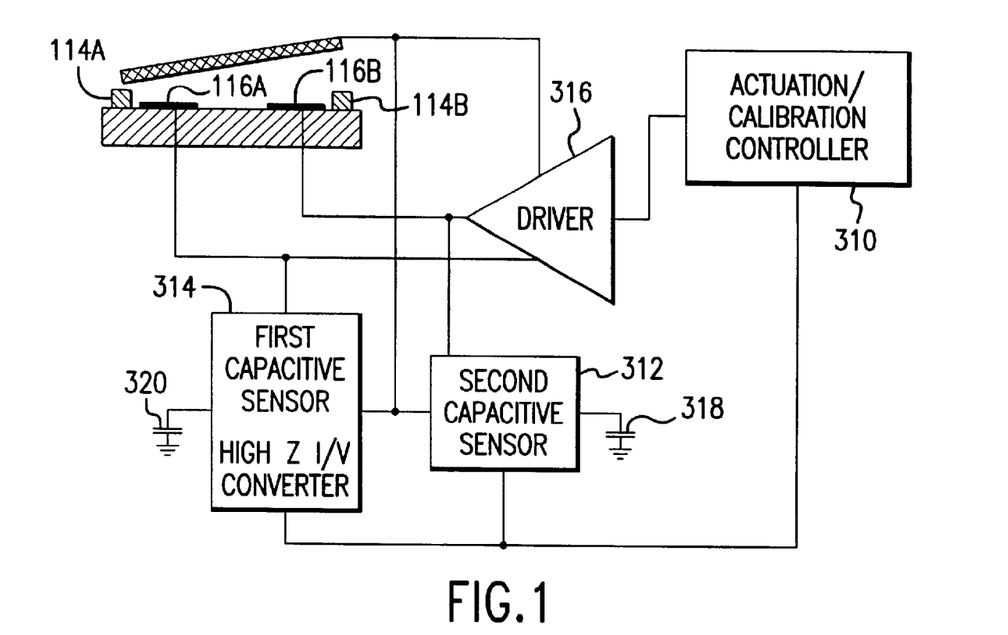
FIG. 1 is a block diagram illustrating the electronics associated with the inventive MEMS mirror system.

FIG. 1 shows a MEMS mirror system 100 and a circuit diagram illustrating the actuation control calibration system, which has been constructed according to the principles of the present invention. A stopped MEMS tilt mirror is used in conjunction with a mirror structure position detection system.

Specifically, an actuation controller/calibration system 310 is provided that controls electrostatic driver 316. This driver establishes the electric fields between the fixed electrodes and the mirror structure 110. In the illustrated example, the driver controls the voltage between the mirror structure 110 and electrode 116A, 116B.

In the illustrated example, position feedback is provided to the actuation/calibration system controller 310 using a mirror structure position detection system. Specifically, a first capacitive sensor 314 and a second capacitive sensor 312 detect the capacitance between fixed electrodes 116A, 116B and the mirror structure 110 usually by reference fixed reference capacitors 318, 320. In one implementation, these sensors are current to voltage converters with high input impedances. The detected capacitive information is provided to the controller 310, which determines the angular position of the mirror structure 110 by reference to a capacitance-to-position look-up table.

These capacitive sensors 312, 314 are subject to long-term drift. Charge accumulation on the mirror structure, for example, can change the apparent capacitance. Further, temperature changes in the electronics or aging also impact accuracy.

To enable recalibration such as updating the capacitance-to-position look-up table, stops 114A, 114B are provided that are used as a physical reference for the position of the mirror structure.

Figure 2:
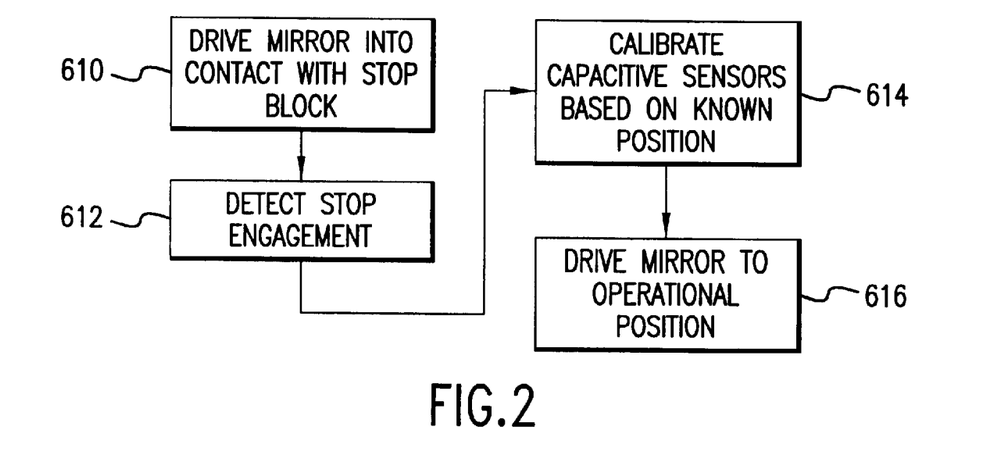
FIG. 2 is a flow diagram illustrating the inventive MEMS mirror calibration process.

With reference to FIG. 2, periodically, for example during and initial calibration and subsequently during operation in its intended environment, the mirror structure 110 is driven into contact with one of the stop blocks 114A, 114B in step 610. When the mirror structure 110 is in contact with the stop blocks, it is in a known position.

In some implementations, engagement is detected by reference the point where the detected capacitance ceases to change with increases in drive voltage. In another example, simply the maximum electrostatic drive voltage is generated between one of the fixed electrodes 116A, 116B and the mirror structure with the knowledge that, at this maximum voltage, the mirror structure will be in contact with one of the blocks.

Then, in step 614, with the mirror in this known position, the capacitive sensors 314, 312 are recalibrated and the look-up table, if used, updated. This removes any accumulated errors due to previous drift.

Now calibrated, the mirror can then be returned to an operation mode as illustrated in step 616.

Figure 3:
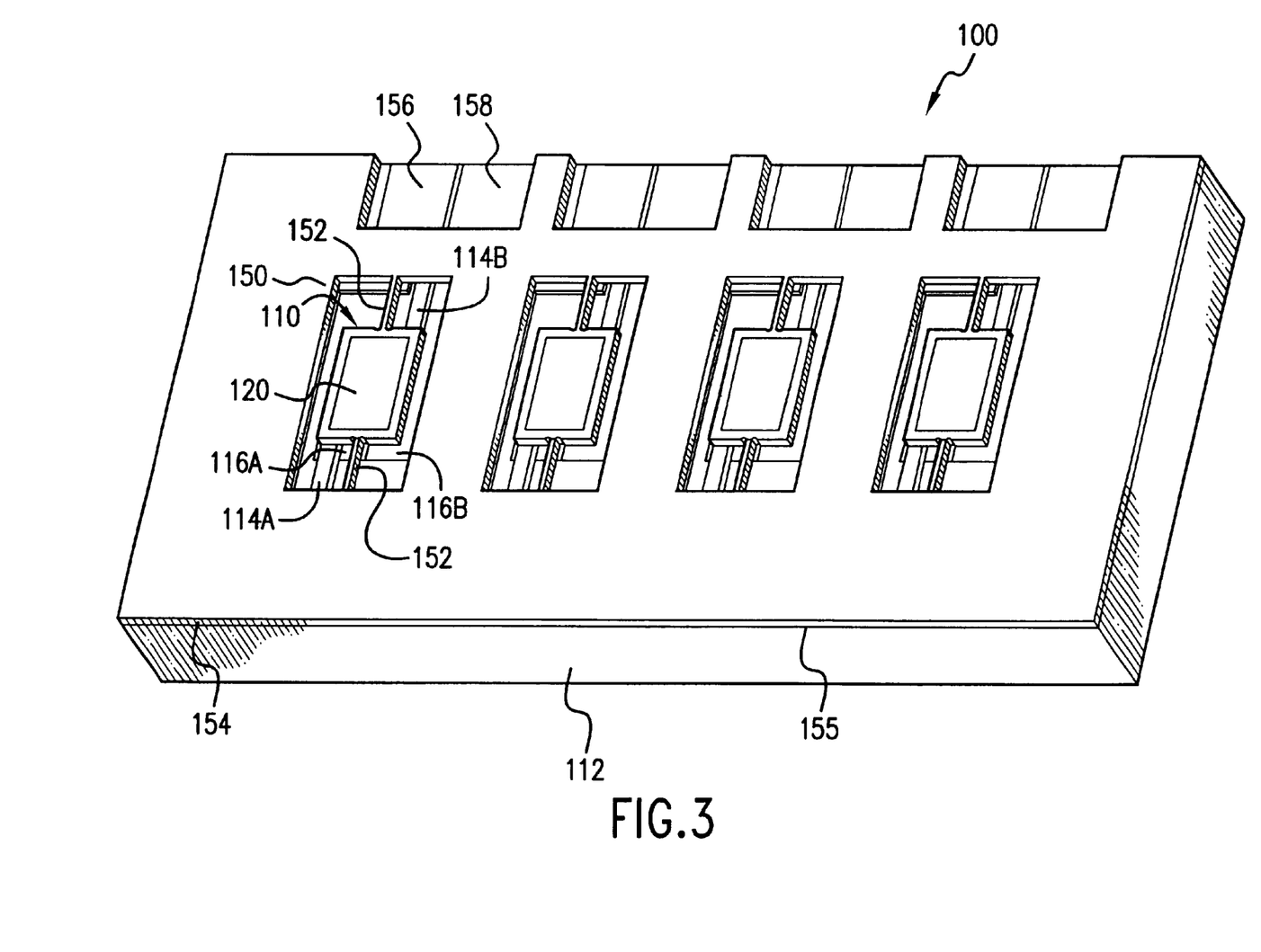
FIG. 3 is a perspective view of a tilt mirror system comprising multiple MEMS movable mirror structures to which the present invention is applicable.

FIG. 3 shows a MEMS mirror system 100, to which the present invention is applicable.

As is relatively common with these systems, the mirror system 100 comprises a substrate 112. This is typically manufactured from handle wafer material. Device layer 154 is formed or attached to the substrate 112 typically with an intervening sacrificial structure or layer(s) 155. The moveable mirror structures are formed in this device layer 154.

In more detail, and according to the invention, each MEMS mirror comprises a mirror body 110. This is connected to a support portion 150 of the device layer 154 via a hinge or torsion arms 152. Typically, a reflective coating 120 is deposited or otherwise formed on the mirror structure body 110. It can be a dielectric thin film coating if high reflectivity, low loss performance is required. More commonly, gold or other metal, such as aluminum, is used as the reflective coating 120.

Two electrodes 116A, 116B are formed or positioned under the tilt mirror body 110. They are used to generate electric fields between the substrate 112 and the mirror body 110. These fields result in electrostatic attraction, which causes the mirror body 110 to tilt out of the plane of the device layer 154. In this way, these mirror systems are used to steer an optical beam that is directed at the mirror body, and specifically the coating 120.

Stops 114A, 114B are located on the substrate, in the illustrated example, within the range of movement of the mirror body 110.

Figure 4A:
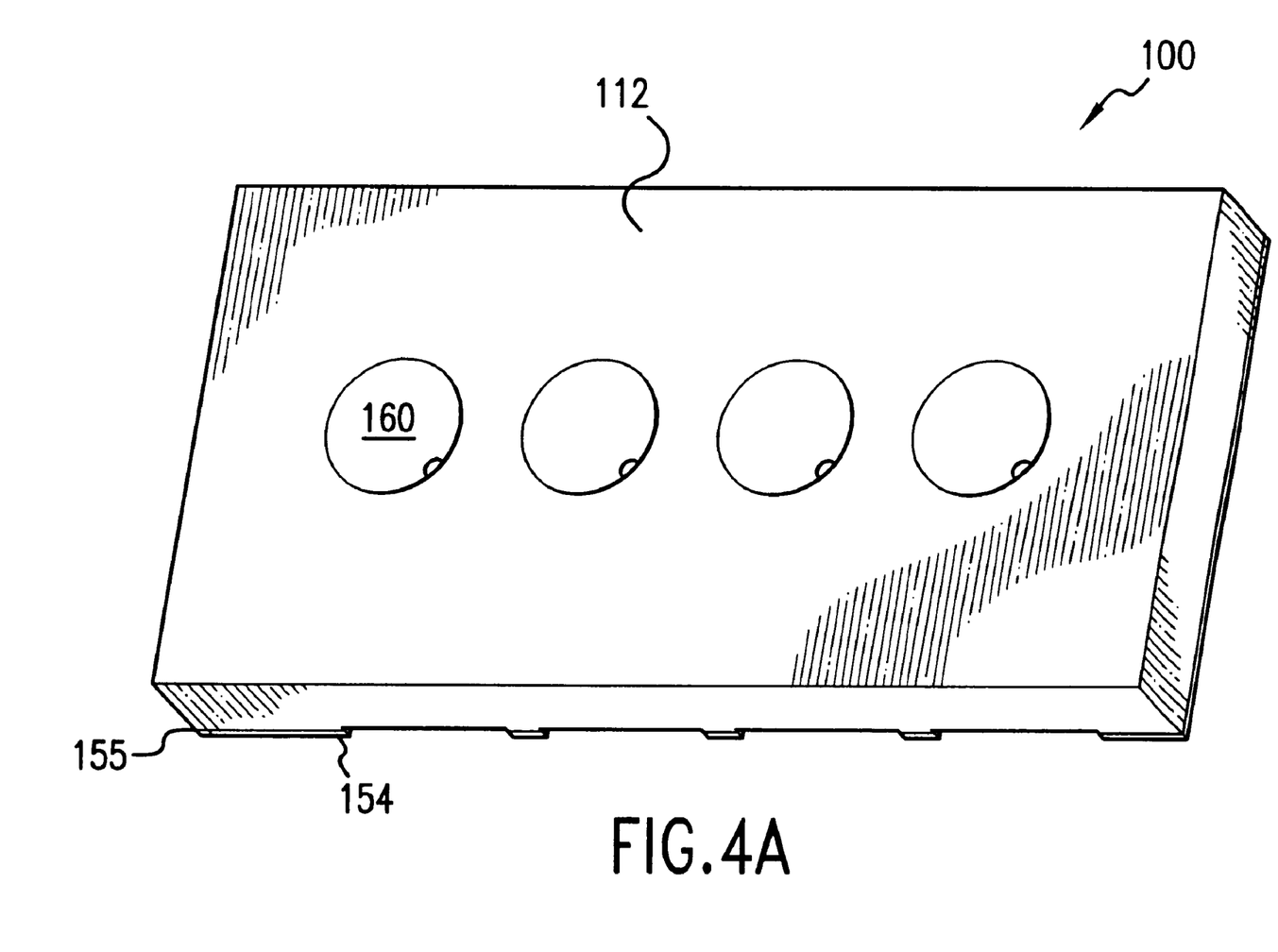
FIG. 4A is a perspective view of a back side of the MEMS mirror system.

FIG. 4A shows the backside of the mirror system 100. Specifically, in the illustrated example, backside optical ports 160 are provided to enable sampling of light that is reflected by the mirror bodies 110 by detecting the portion of light that is transmitted through the mirror bodies and then through these backside optical ports 160 to a detector, for example.

Figure 4B:
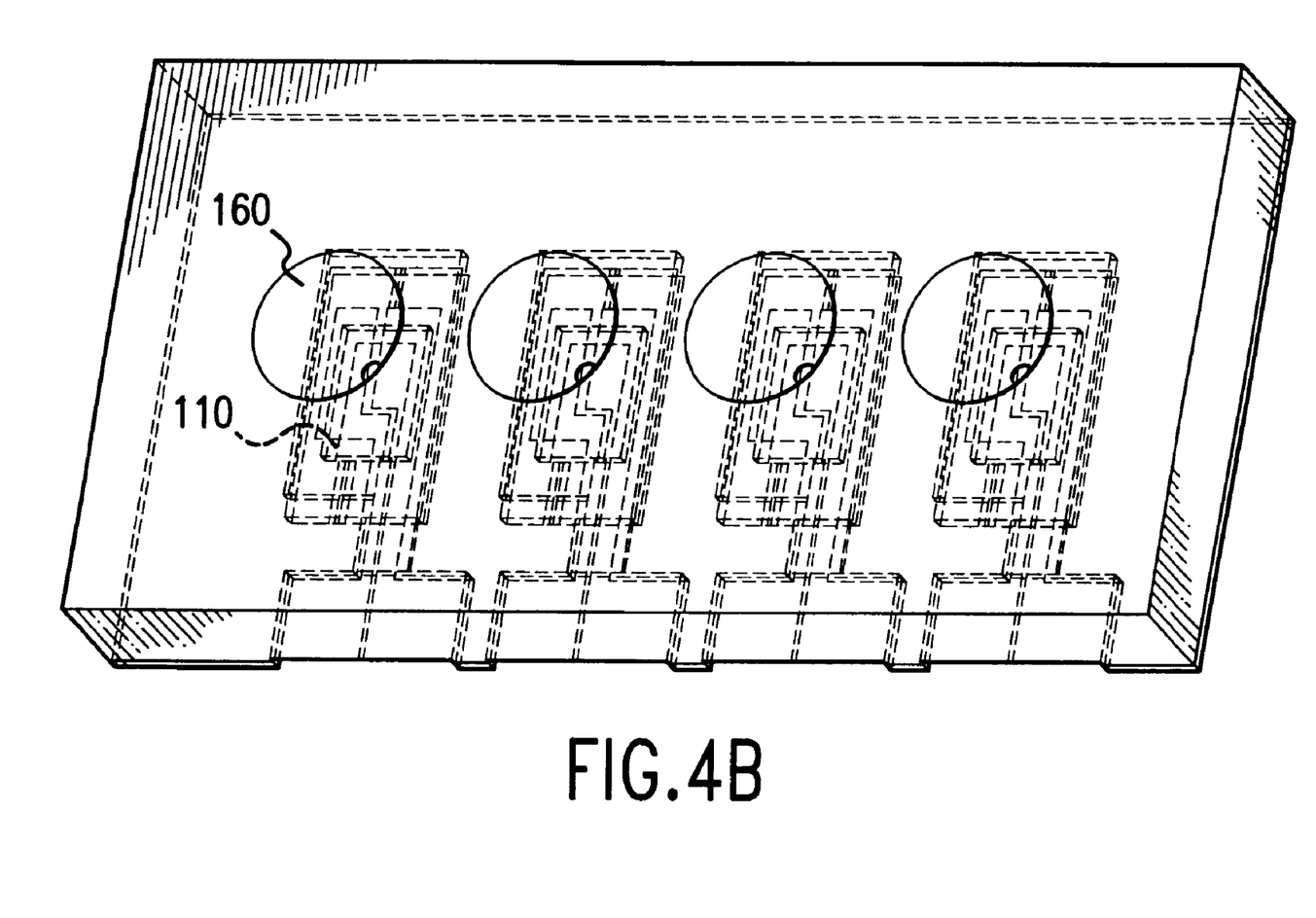
FIG. 4B is a perspective view of the back side showing hidden lines in phantom.

FIG. 4B shows the hidden lines in phantom illustrating the relationship between the optical ports 160 and the mirror bodies 110.

Figure 5A:
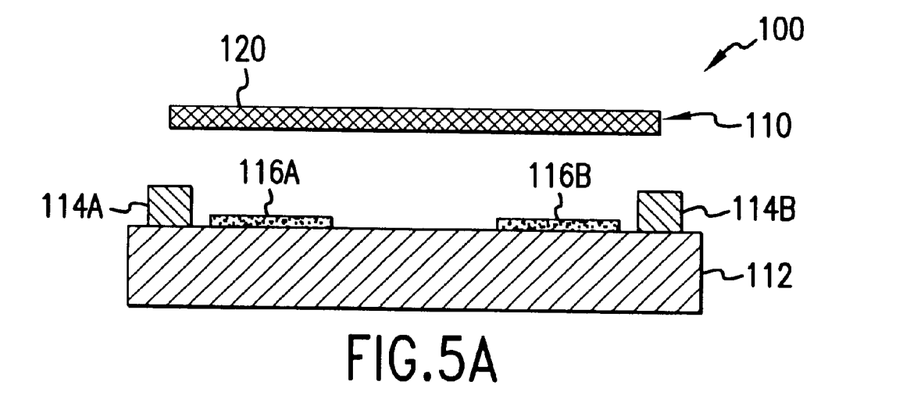
FIGS. 5A–5C are schematic cross-sectional views of a movable MEMS mirror system in three states of operation, according to the present invention.
Figure 5B:
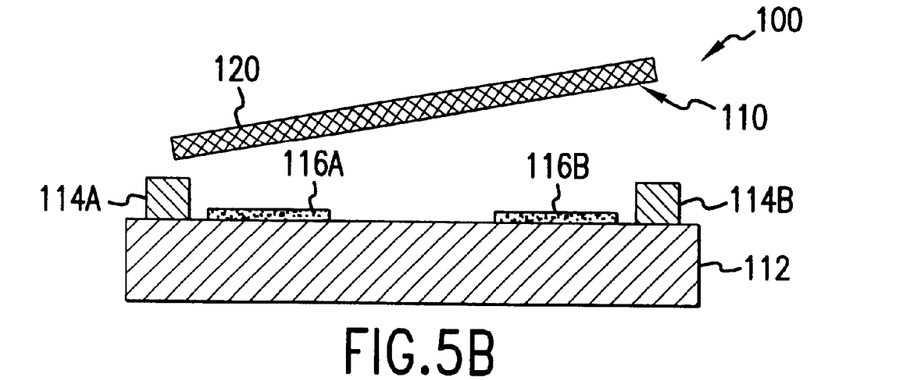
Figure 5C:
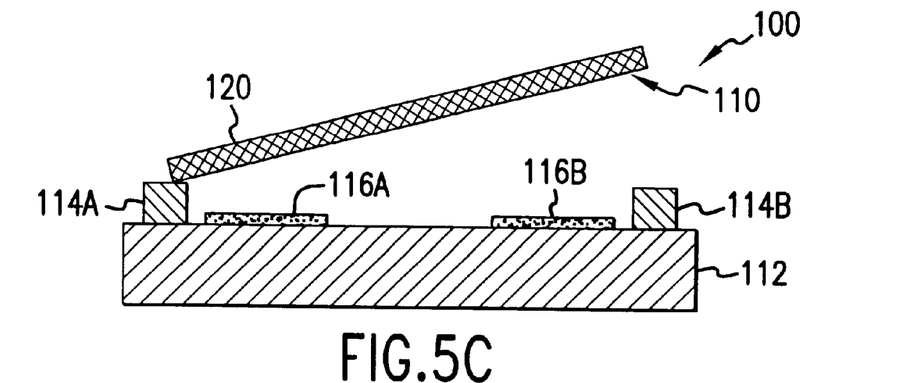

FIGS. 5A–5C illustrate the operation of the movable MEMS mirror according to the present invention. Specifically, FIG. 5A illustrates the typical neutral state. Specifically, when there is no electrostatic drive voltage between the mirror structure 110 and the electrodes 116A, 116B, the mirror structure is parallel to the substrate 112.

Generating an electric field between the inner structure 110 and electrode 116A causes an electrostatic attraction, which causes the mirror structure 110 to tilt out of the plane of the is device layer as illustrated in FIG. 5B. Typically, the degree of this tilt is detected by the mirror structure position detector system, which includes the capacitive sensors useing either the drive electrode 116A or a separate sensor electrode. As illustrated in FIG. 5C, control of the mirror actuation system drives the mirror structure 110 into contact with one of the stops 114A, 114B. Now, the mirror 110 is in a known position due to the mechanical engagement between the mirror structure 110 and the stop 114A.

Figure 6A:
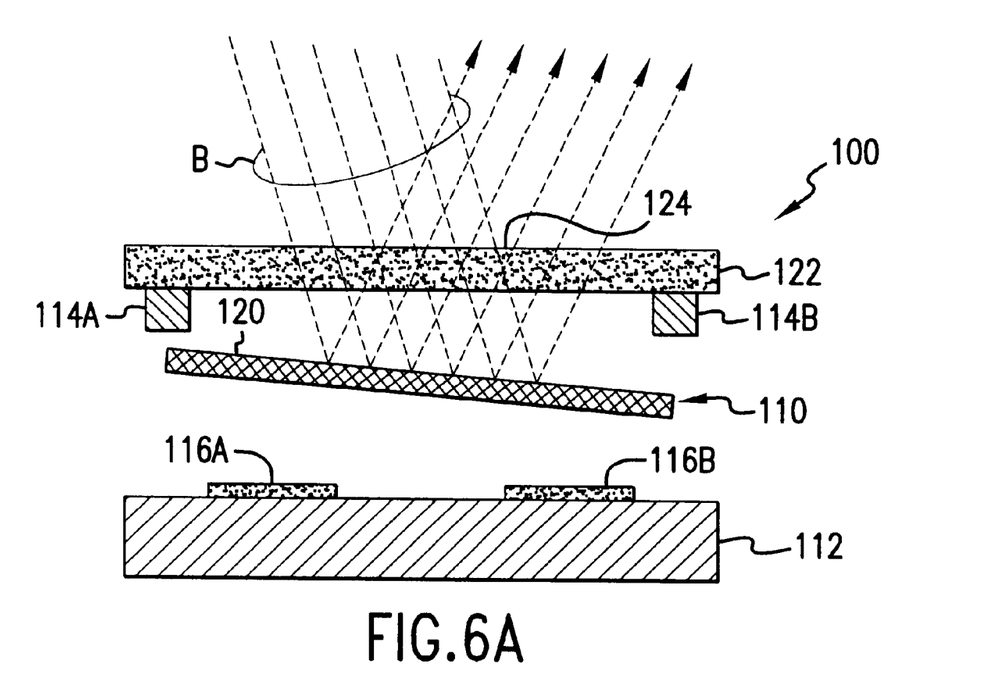
FIGS. 6A and 6B are schematic cross-sectional views of the inventive MEMS mirror system according to a second embodiment.
Figure 6B:
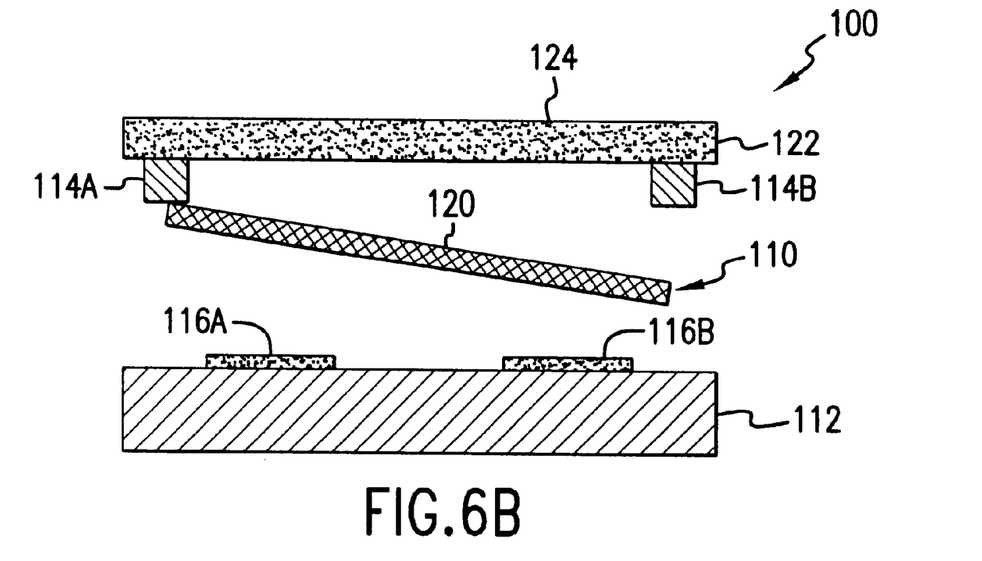

FIG. 6A illustrates a second embodiment of the MEMS mirror system. This figure also illustrates the incoming beam B that is reflected by the reflective coating 120 of the mirror structure.

In this example, stops 114A, 114B are located on an upper window structure 122 that is located above the mirror structure 110. As illustrated in FIG. 4B, further increasing the electrostatic voltage between the mirror structure 110 and electrode 116B, for example, causes the mirror structure 110 to tilt into physical contact with stop 114A, located on the upper window structure 122.

The window structure is transmissive to the beam B, at least in the region of an optical port 124. Alternatively, the material of the window structure can be removed along the axis of the optical port 124.

Figure 7A:
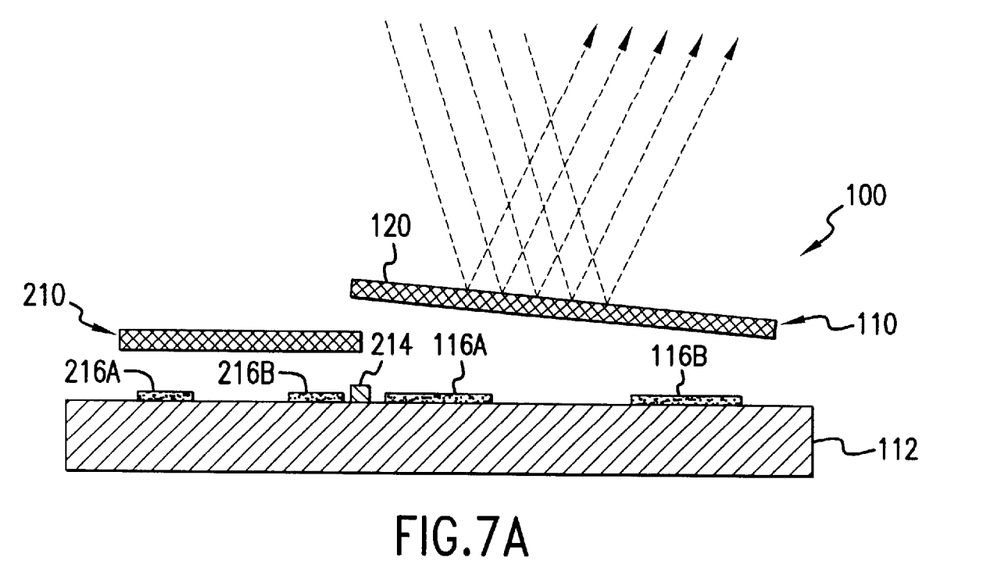
FIGS. 7A–7C are schematic cross-sectional views of the MEMS mirror system according to a third embodiment of the present invention.
Figure 7B:
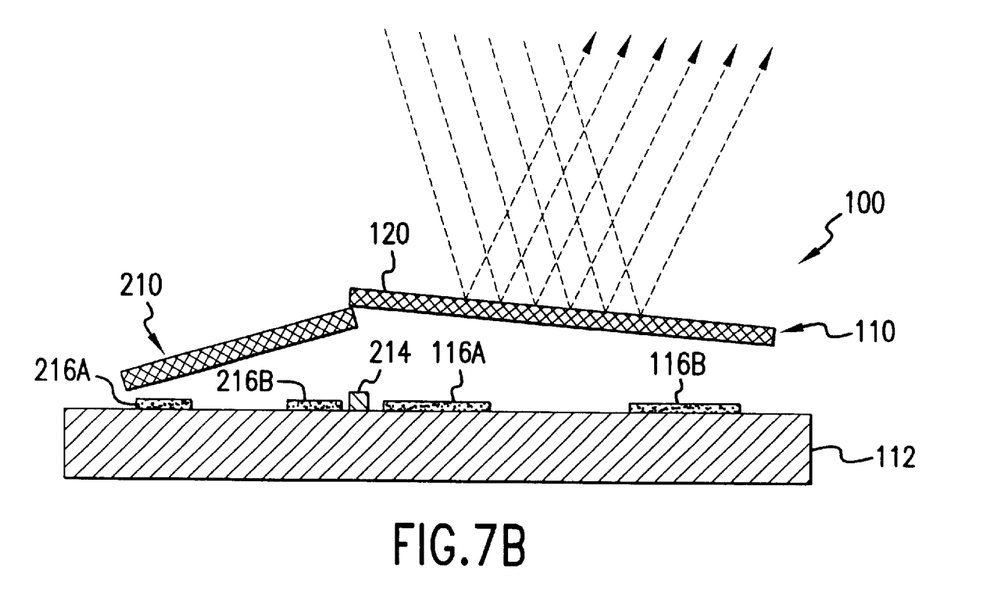

FIGS. 7A–7B illustrate an alternative implementation. Specifically, one of the disadvantages associated with the previous embodiments is that the mirror structure 110 must be moved out of its operational position to be calibrated. This problem is addressed in the third embodiment illustrated in FIGS. 7A–7C.

Specifically, as illustrated in FIG. 7A, the mirror structure 110, with drive electrodes 116A, 116B is configured generally as discussed previously. Stops, however, are not required within the range of movement of mirror structure 110. Instead, a calibration structure 210 is additionally provided. This calibration structure extends into the range of movement of the mirror structure 110. Stop 114 is instead provided within the range of movement of the calibration structure 210. Further, actuation/position detection electrodes 216A, 216B are provided for the calibration structure.

Next, as illustrated in FIG. 7B, during a calibration cycle, the calibration structure 210 is moved into contact with the mirror structure 110. Generally, this contact will not disturb the operation and position of the mirror structure because of the closed loop control of the position of the mirror structure 110. When the calibration structure 210 in contact with the mirror structure 110, the calibration structure position detection system records the position of the calibration structure 210 by reference, for example, to the capacitance between the calibration structure 210 and the calibration structure electrodes 216A, 216B.

Figure 7C:
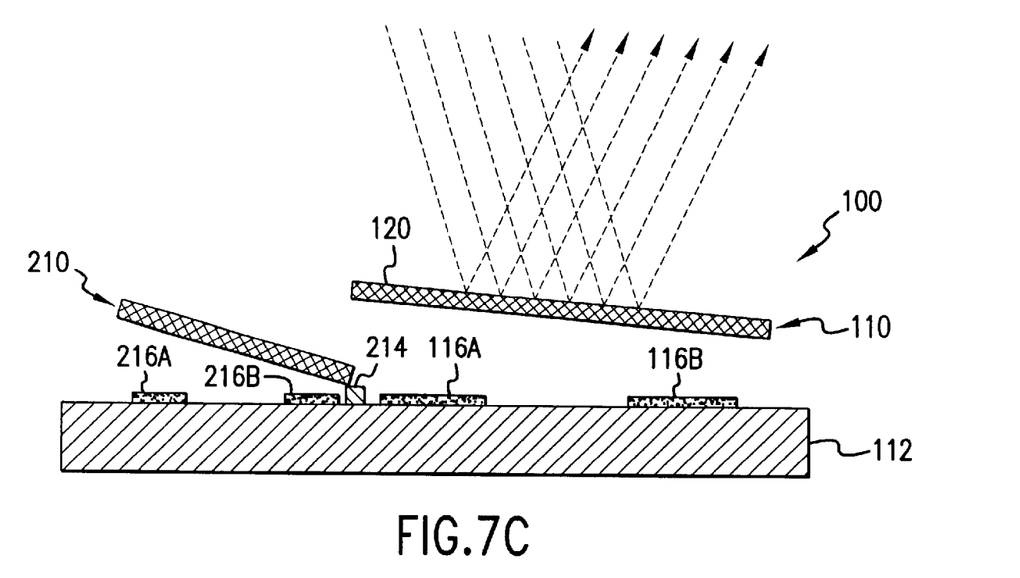

Then, as illustrated in FIG. 7C, the calibration structure 210 is driven into contact with the stop 214. The calibration structure 210 travels between its contact with the mirror structure 110 and the stop 214 yielding information concerning the distance between the stop 214 and the mirror structure 110. This information is then used by the calibration system to calibrate the position detection systems for the mirror structure 110.

While this invention has been particularly shown and described with references to preferred embodiments thereof, it will be understood by those skilled in the art that various changes in form and details may be made therein without departing from the scope of the invention encompassed by the appended claims.

What is claimed is:

1. A movable MEMS mirror system, comprising:
    a movable mirror structure having a range of movement;
    a mirror actuation system that moves the mirror structure;
    a stop;
    a mirror structure position detection system that electrically monitors a position of the movable mirror structure within the range of movement; and
    a calibration system that calibrates the mirror structure position detection system in response to a detected position of movable mirror based on contact with the stop to thereby compensate for drift in the mirror structure position detection system.

2. A mirror system as claimed in claim 1, wherein the movable mirror structure comprises a reflective coating.

3. A mirror system as claimed in claim 1, wherein the mirror structure comprises a mirror body and at least two torsion arms connecting the mirror body to a support.

4. A mirror system as claimed in claim 1, wherein the stop is positioned over the mirror structure.

5. A mirror system as claimed in claim 1, wherein the stop is positioned under the mirror structure.

6. A mirror system as claimed in claim 1, wherein the stop is positioned within the range of movement.

7. A mirror system as claimed in claim 1, wherein the calibration system controls the mirror actuation system to pivot the mirror structure into contact with the stop and then calibrates the mirror structure position detection system.

8. A mirror system as claimed in claim 1, further comprising a movable calibration structure and a calibration structure position detection system that monitors a position of the calibration structure, the calibration structure contacting mirror structure and the stop, the calibration system determining a position of the mirror structure in response to the distance the calibration structure moves between contacting the stop and contacting the mirror structure.

9. A mirror system as claimed in claim 1, wherein the mirror structure position system comprises a capacitive sensor that determines a position of the mirror structure in response to a capacitance between the mirror structure and fixed electrode.

10. A method for calibrating a position detection system of a MEMS mirror system, the method comprising:
    actuating a movable mirror structure in response to positional information from a mirror structure position detection system; and
    calibrating the mirror structure position detection system in response to a stop.

11. A method as claimed in claim 10, wherein the movable mirror is actuated to steer an optical signal reflected by the mirror structure.

12. A method as claimed in claim 10, wherein the movable mirror is actuated by modulating an electrostatic voltage between the mirror structure and a fixed electrode.

13. A method as claimed in claim 10, wherein the step of calibrating the mirror structure comprising pivoting the mirror structure into contact with the stop.

14. A method as claimed in claim 10, wherein the step of calibrating the mirror structure is performed with a periodicity based on drift in the mirror structure position detection system.

15. A method as claimed in claim 10, wherein the step of calibrating the mirror structure comprises:
    contacting a calibration structure to the mirror structure;
    contacting the calibration structure with the stop; and
    determining a distance the calibration structure moves between contacting the stop and contacting the mirror structure.

16. A method as claimed in claim 10, wherein the mirror structure position detection system generates the positional information by monitoring a capacitance between the mirror structure and a fixed electrode.

* * * * *